June 7, 1932.   H. E. WARREN   1,862,376
ELECTRIC MOTOR
Filed July 14, 1930   2 Sheets-Sheet 1
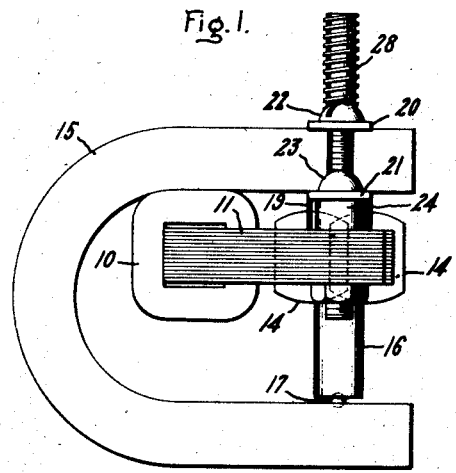
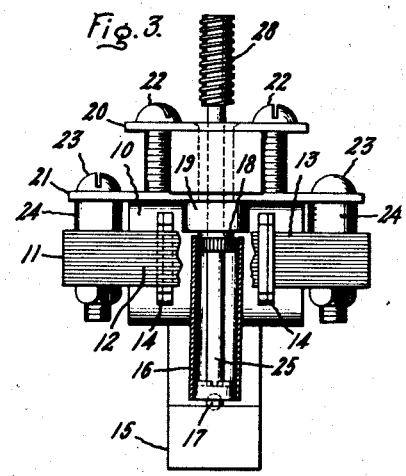
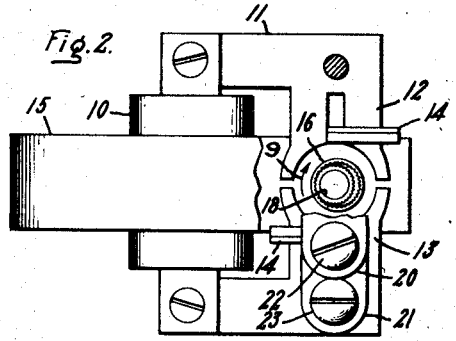
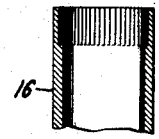
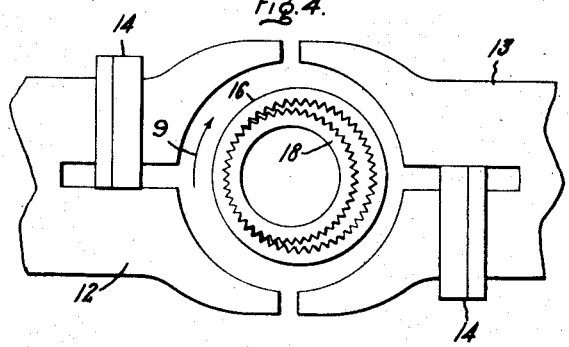
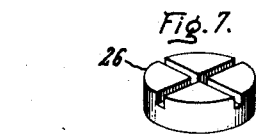
Inventor:
Henry E. Warren
by Charles V. Tullar
His Attorney June 7, 1932.  H. E. WARREN  1,862,376
ELECTRIC MOTOR
Filed July 14, 1930   2 Sheets-Sheet 2

Inventor:
Henry E. Warren,
by Charles A. Tullar
His Attorney

Patented June 7, 1932

1,862,376

UNITED STATES PATENT OFFICE

HENRY E. WARREN, OF ASHLAND, MASSACHUSETTS, ASSIGNOR TO WARREN TELECHRON COMPANY, OF ASHLAND, MASSACHUSETTS, A CORPORATION OF MAINE

ELECTRIC MOTOR

Application filed July 14, 1930. Serial No. 467,742.

My invention relates to electric motors and is particularly adapted for use in small motors such as those for driving timing devices. One object of the invention is to provide a self starting synchronous motor operating at a very low speed so as to substantially eliminate the reduction gearing and lubricating problems usually present in small timing motors. Another object of the invention is to provide a small size, low cost motor of simple construction which is quiet in operation and economical in the consumption of electric energy. Other objects and advantages of the invention will appear as the invention is explained.

In carrying my invention into effect I provide an alternating current field member, preferably of the single phase, bipolar, shaded pole, type for producing a rotating magnetic field in the air gap together with means for producing a unidirectional field generally at right angles to the rotating magnetic field through the air gap. I preferably employ a permanent magnet for the unidirectional field. These two fields combine to act upon a movable magnetic armature member to give it a gyratory motion which is synchronous with the frequency of the alternating current supply. The motion of the gyratory element is confined by causing it to roll on a suitable retaining surface. The contacting surfaces of the gyratory and retaining members are of different diameters and peripheral lengths and are of such character as to resist any appreciable slipping motion between the two in a tangential direction. As a consequence, a slow relative rotation between the gyratory and retaining members takes place depending upon the difference in diameters and the character of the contacting surfaces. If one of the surfaces is prevented from rotating the other is caused to rotate and becomes the rotor element of the motor. Suitable means are provided to transmit the rotary motion to a terminal shaft.

Figure 11:
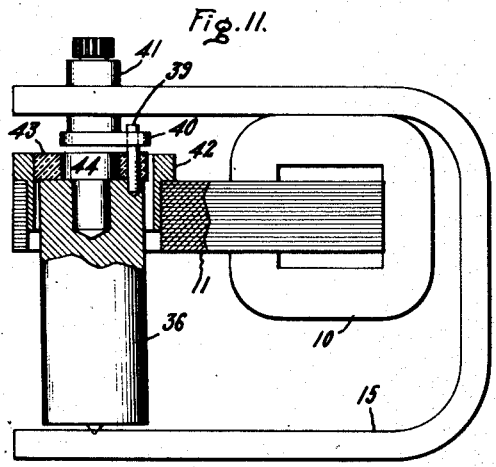
Figure 12:
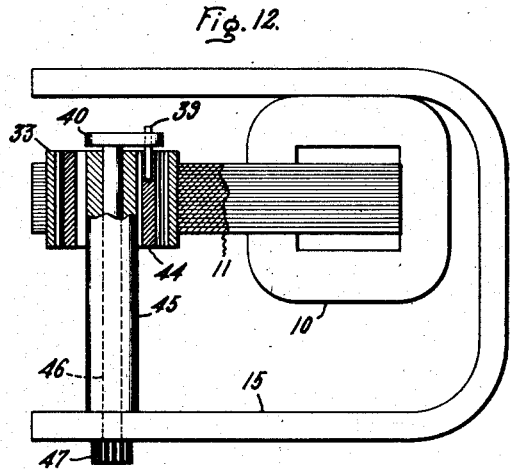
Figure 8:
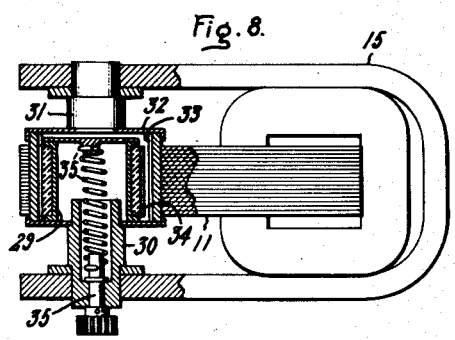
Figure 10:
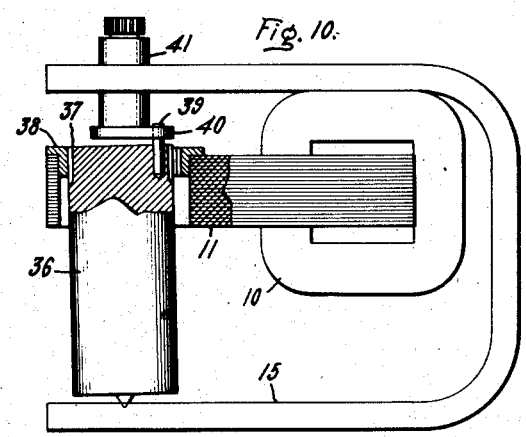
Figure 9:
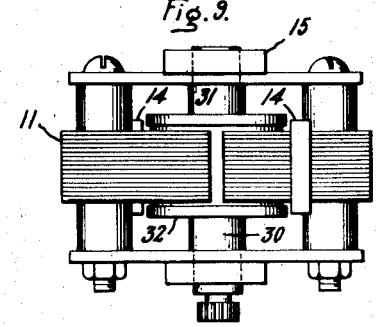
Figure 13:
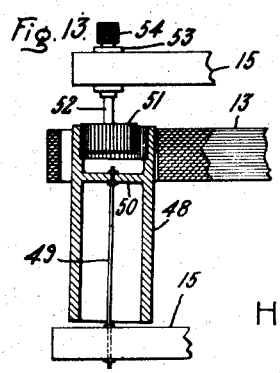

This general type of motor is believed to be broadly new and may be built in a variety of forms. In the drawings, Figs. 1, 2 and 3 represent different views in planes at right angles to each other of a form of my invention in which the gyratory element comprises the rotor and gyrates and revolves about an inner stationary retaining surface. Fig. 4 is an enlarged view of the geared surfaces between the gyratory and retaining members of the motor of the form shown in Figs. 1 to 3. Fig. 5 is a sectional view showing the inner geared surface of the gyratory armature member of this motor. Figs. 6 and 7 show details of a mechanical connection for transmitting rotary motion from the gyratory member to a terminal shaft. Figs. 8 and 9 show different views of a motor where the retaining member is stationary and external to the gyratory member. In this modification a flexible spring is used to transmit the rotary motion from the gyratory member. Fig. 10 shows a form of the invention where motion from the gyratory rotor is transmitted upward through a pin and crank arm. Fig. 11 is generally similar to Fig. 10 except that the contacting surfaces between the gyratory and retaining members are frictional surfaces instead of being geared. Fig. 12 shows a modification where the gyratory rotor element is a free external gear wheel; and Fig. 13 shows a modification where the gyrating armature is held against rotation and the only rotating element is the terminal shaft structure.

In a copending application Serial No. 467,743, (docket 46763) filed concurrently herewith and assigned to the same assignee as the present invention, I have described and claimed further modifications covered by the broad claims in this application, such other modifications differing from those shown herein primarily in respect to the character of contacting surfaces between the gyratory and retaining members and in the manner of transmitting rotary motion from the motor.

Referring more particularly to Figs. 1 to 4, I have here represented a form of my invention in which the combination of a rotary magnetic field, produced by a single phase, bipolar, shaded pole field member and a unidirectional field produced by a permanent magnet produces a gyratory motion of a magnetic armature element upon which the two fields act simultaneously. The nature of the single phase, bipolar shaded pole field member is best shown in Fig. 2, which may be considered a plan view of Fig. 1. 10 represents the field coil which may be connected to a 110 volt, 60 cycle source or designed for other voltages and frequencies as is customary in the design of alternating current motors generally. 11 represents the field iron terminating in split pole pieces 12 and 13, one-half of each pole piece being shaded by a short-circuited band 14, preferably of copper. As is well understood in the art the shading coils cause the flux therethrough to lag behind the unshaded portion of the poles and change the alternating flux field into a shifting or rotary field in the direction indicated by the arrow 9 in Figs. 2 and 4. We may thus imagine that this arrow represents a north pole field emanating from the stationary field poles which travels about the circular air gap in the direction of the arrow and that diametrically opposite there is a south pole field travelling in the same direction. Any other type of field structure suitable for producing a bi-polar rotating magnetic field may be used. In a 2-pole field energized at 60 cycles the field travels at the rate of 3600 R. P. C. in synchronism with the frequency.

The unidirectional field previously referred to is produced by a permanent magnet 15 although if desired this field might be produced by a direct current electromagnet. The permanent magnet has north and south poles positioned so as to produce a unidirectional field generally at right angles to the axis of rotation of the rotating magnetic field through the air gap space but this unidirectional field is shifted back and forth to some extent by the action of the alternating field as will presently appear.

In the air gap space is a magnetic member 16, preferably of steel, which in this case comprises a tubular gyratory rotor element of the motor. This tubular member extends downward and its lower end is closed and has a ball bearing 17 supported on the lower pole of the permanent magnet which permits 16 to rotate and its upper end to gyrate. The inner, upper surface of member 16 has gear teeth cut therein which mesh with a stationary gear 18 of a lesser diameter and which has a few less teeth. Gear 18 comprises the retaining member in telescoping relation with 16 and about which member 16 gyrates, gear 18 limiting the orbit of such gyration within a circle concentric with the rotating magnetic field but of slightly greater dimensions than the armature. Gear 18, and its supporting bushing 19, are made of non-magnetic material and are held in place by an integral hollow bushing of reduced size extending upward through a central opening in the upper pole of the permanent magnet as indicated in dotted lines in Fig. 3. The permanent magnet is clamped between plates 20 and 21 by screws 22 and plate 21 is clamped to the alternating field structure 11 by bolts 23 but spaced therefrom by sleeves 24. Plate 21 and bolts 23 are preferably of magnetic material such as soft steel and serve, in this modification, to convey the greater portion of the unidirectional flux from the upper pole of the permanent magnet into the pole pieces 12 and 13 of the alternating current magnet. The collars 24 are preferably of copper and serve to choke back the alternating flux of the electromagnet and prevent its passage through the magnetic bar 21. It is of course desirable that the alternating flux shall pass through the air gap in which the upper end of the gyratory member 16 is located and not be short-circuited through piece 21.

We may assume the upper pole of the permanent magnet to be a south pole and the lower pole a north pole. The north pole flux magnetizes member 16 and its upper end may thus be considered to be a north pole or have a north pole magnetic polarity at all times. The upper end of member 16 which may be termed a polarized magnetic armature will therefore be attracted by the rotating south pole and repelled from the rotating north pole of the rotating magnetic field produced by the alternating current electromagnet in the air gap surrounding the upper end of member 16. The upper end of 16 is of such dimensions as to permit of a limited free bodily eccentric movement. Since this field is rotating and the member 16 is strongly magnetized it will gyrate around the retaining gear 18 in the direction of and in synchronism with the rotating magnetic field. The magnetic forces and centrifugal force definitely maintain the gear teeth in mesh. The permanent magnetic flux path between the upper pole of the permanent magnet and the upper end of member 16 will tend to shift back and forth between a path through the left end of bar 21 and pole piece 12 when it is a south pole and the right end of bar 21 and pole piece 13 when it is a south pole as viewed in Fig. 3. This permanent flux will also tend to shift from the unshaded to the shaded pole portions of the electromagnet. Thus, strong gyratory magnetic forces are obtained to maintain the permanently magnetized gyratory member in a synchronous gyratory movement.

I have found that the magnetic bar 21 and magnetic bolts 23 are not essential since, if omitted, sufficient of the permanent magnet flux will pass through the air gap between the upper pole of the permanent magnet and the upper end of member 16 to produce the desired results. In fact any arrangement to maintain the armature polarized at a definite magnetic polarity may be used.

The gyratory movement of 16 is transmitted into a component of rotary movement by reasons of the different number of teeth in 16 and 18. Thus, if the gear 16 has 150 teeth and the gear 18 has 145 teeth, 16 will rotate $$\frac{5}{150} \text{ or } \frac{1}{30}$$

of a revolution for each complete gyration. Such rotation will be in the same direction as that of gyration in this case. Thus, in a 60 cycle field revolving at 3600 R. P. M. the member 16 will rotate in the same direction at 120 R. P. M. This sub-synchronous speed of rotation may be varied somewhat by varying the relative number of teeth. However, the outer gear 16 should have at least two more, and preferably at least three more teeth than gear 18 on account of clearance and the tooth pitch should be approximately the same in both gears. The gear diameters may be changed somewhat to bring about the most desirable conditions after selecting the speed reduction desired.

In the modification shown in Fig. 3 the rotary motion of member 16 is transmitted to a terminal shaft 25 by means of a flexible coupling, the two parts of which are shown in Figs. 6 and 7. The part 26 shown in Fig. 7 is secured in the bottom end of tubular member 16 so as to turn with 16. It is provided with crossed slits in its upper surface into which the corresponding cross vanes 27 on the lower end of shaft 25 loosely extend. By this means rotary motion is transmitted to shaft 25 without transmitting any gyratory motion. Shaft 25 extends up through hollow gear 18 and bushing 19 and is provided at its outer end with a worm gear 28 to drive such devices as is desired. Shaft 25 should be made of non-magnetic material.

The operation of this motor may be reviewed as follows: Alternating current is applied to field winding 10 producing a rotating magnetic field in the air gap. The gyratory action of the polarized magnetic armature starts instantly in the direction of rotation of the magnetic field at a speed determined by the frequency, or 3600 R. P. M. on 60 cycles. This results in the upper end of 16 rolling about stationary gear 18 and in mesh therewith, causing member 16 to rotate at a definite fraction of the synchronous speed of gyration and causing shaft 25 to rotate at what may be termed a very low sub-synchronous speed. The torque of the motor as transmitted to shaft 25 is ample for the driving of such devices as clocks, time switches, recording charts, etc. When the current is cut off from the field coil 10 the motor stops instantly.

The inertia of rotation is very small and the permanent magnet field tends to magnetically lock the rotor as soon as the alternating current field is cut off. The device can thus be used to measure time very accurately under starting and stopping conditions, and since the polarity of the armature is always the same, it can be used to measure phase relation. The very slow speeds possible substantially eliminate the gear reduction and lubrication problems heretofore necessary with high speed synchronous electric timing motors. The economy of this motor is very much higher than synchronous timing motors heretofore used, probably due to the fact that the permanent magnet field supplies a large part of the operating flux. Rough experiments indicate that the starting wattage of this motor is not more than $\frac{1}{10}$th of that necessary to start the usual synchronous timing motor such as is described in my United States Patent No. 1,546,269, July 14, 1925.

In Figs. 8 to 13 inclusive, the alternating current field and unidirectional field producing means may be substantially the same as have been already described and are indicated by like reference characters. In Fig. 8 the gyratory rotor element comprises a hollow steel cylindrical member 29 permanently magnetized at a given polarity by the permanent magnet by reason of the pole piece portion 30 and the upper pole of the permanent magnet, between which the member 29 is located. The support 31 is preferably of non-magnetic material. The gyratory member is enclosed in a stationary casing 32. The end walls of this casing should preferably be made of non-magnetic material. The other part of the casing may be made of either magnetic or non-magnetic material. A gear 33 is cut in the inner wall of the stationary casing and this comprises the retaining surface on which the rotor gyrates. A gear 34 is provided on the exterior surface of the gyrator member and if desired this gear may be made of crepe rubber or other suitable material of a noise deadening character as indicated. Gear 33 is of larger diameter than gear 34 and has a larger number of teeth so as to allow gear 34 to gyrate and rotate slowly thereon in the manner and for the purpose previously explained. Casing 32 is unnecessary to retain the gyratory rotor in place when in operation but it keeps out dust and assists in retaining the stationary parts in a fixed relation. Rotary motion of 29 is transmitted to the terminal shaft 35 by means of the spring coupling 35'. The action of this motor is the same as that previously described except that since the rotary gear 34 has the smaller diameter and smaller number of teeth its rotation is in the opposite direction to that of the rotating magnetic field and the direction of gyration.

In this construction the permanent magnet 15 is smaller, having just enough spread between its parallel legs to embrace the coil 10.

Fig. 9 shows a left end view of the motor of Fig. 8 indicating its compact rugged construction.

Fig. 10 shows a simple form of motor built in accordance with the invention. The rotor 36, which is also the gyrating member, is a solid steel member pivoted at its lower end on one pole of the permanent magnet so as to allow it to rotate and to gyrate. The upper end has a fine toothed gear 37 cut therein having for example 90 teeth. The retaining member 38 comprises an internal cut gear having for example 93 teeth. Ample clearance is provided between the contacting gear surfaces to allow member 36 to gyrate and roll about the gear 38. With the number of teeth in the gears indicated above, 36 will rotate 3/90ths or 1/30th of a revolution for each gyration and with 60 cycle frequency its speed of rotation will be 120 R. P. M. The direction of rotation will be opposite to that of gyration. The gear 38 which is secured between the pole faces of the electromagnet will be preferably of non-magnetic material and one or the other of the gears may have a toothed surface of a noise deadening material although for applications where slight noise is not objectionable it will be more economical to cut the gears in the metallic surfaces.

The rotation of 36 is transmitted through a pin 39 therein and a crank arm 40 on a shaft passing through a non-magnetic bushing 41 in the upper pole piece of the permanent magnet. Pin 39 is not fastened in the crank arm but merely rests against its back edge. If desired, the crank arm may be slotted to engage the driving pin.

In Fig. 11 I have shown a form of the invention which is similar to that shown in Fig. 10 with the exception that the geared contacting surfaces are replaced by smooth surfaces at least one of which is a friction surface such as rubber. Thus, the retaining ring 42 secured between the pole pieces of the electromagnet may be a non-magnetic ring having a smooth circular inner surface. 43 may be a rubber ring securely mounted on a non-magnetic bushing 44 having a shank extending into the top of member 36. Assuming no slippage between the contacting surfaces the backward speed of rotation of 36 in a 60 cycle motor is equal to $$3600 - \frac{d}{d'}$$

3600 where $d$ and $d'$ are the diameters of the contacting surfaces of 43 and 42 respectively. This speed will be constant unless the motor is loaded to a point where slipping between the contacting surfaces occurs. Such a motor is very quiet in operation and will be useful where exact speed ratio is not necessary or in applications where it is desirable to take advantage of a slip friction clutch in the motor drive. If the unidirectional field is produced by an electromagnet instead of a permanent magnet it will be possible by varying the unidirectional field strength to control the slipping action as desired. Due to the small clearance necessary between 42 and 43 the diameters of the telescoping contacting surfaces may be made more nearly equal and the speed reduction still further increased as compared to the geared arrangements.

The form of motor shown in Fig. 12 has a free gyrating element generally similar to that of Fig. 8 and a motion transmission device generally similar to Figs. 10 and 11. The gyrating rotor element is a loose magnetic ring 44 provided with gear teeth on its outer periphery and permanently magnetized through the fixed steel tube 45 from the lower pole piece of the permanent magnet. 33 is the non-magnetic retaining member secured in the pole faces of the electromagnet and provided with teeth on its inner surface. Member 44, like the corresponding member in Fig. 8, has no bearing in the ordinary sense of the word and requires no lubrication. It gyrates on its own axis and does not transmit this gyrating motion but merely its rotary motion. The rotary motion is transmitted through pin 39, crank 40, to a shaft 46 extending downward through 45 to a pinion 47.

In the modifications shown in Figs. 10, 11 and 12 it will be feasible to make the upright steel members 36 and 45 the permanent magnets and provide any suitable return path for the unidirectional magnetic flux. Thus in Fig. 12, 45 may be a cobalt steel permanent magnet and 15 a magnetic return path for the permanent magnet flux.

In all the motors thus far described the gyrating element has also been the rotor element. However, in Fig. 13 I have shown a construction where the gyrating element does not rotate. Owing to lack of room the complete motor has not been shown but its construction will otherwise be similar to those previously described. In Fig. 13, 48 represents the gyrating element comprising a steel tube having a gear cut in its upper inner surface and extending downward in close proximity to the lower pole of the permanent magnet. This element is held from rotation by reason of a slender rod 49 rigidly secured at its lower end in the permanent magnet and at its upper end to a cross-piece 50 near the upper end of tube 48. Member 48 therefore can not rotate but it may gyrate freely due to the spring action in the slender rod 49. This rod may be of steel of such dimensions as to be easily bent by the magnetic forces acting at the top of the tube to maintain the geared surface of the tube 48 in contact with an inner gear wheel 51 having a few less teeth than 48. Gear 51 is mounted directly on the terminal shaft 52 which has a bearing in a bushing 53 extending through the upper pole piece of the permanent magnet and provided with a drive pinion 54. In this arrangement gear 51 is directly driven in the opposite direction to that of gyration at a speed determined by the difference in the number of teeth in 48 and 51.

All of the motors described operated on the same general principles and I have not considered it necessary to review these principles in describing the various different structural modifications. From the foregoing description it is seen that I have provided a motor having the advantages of simple, compact construction, low in cost and providing a low speed without complicated gear reduction and lubricating problems. Where a permanent magnet field is used to produce the unidirectional flux the efficiency of the motor is far superior to other motors for the same class of work. Provision may be made for changing the reduction speed ratio in these motors by changing the geared surfaces or parts for others having a different tooth relationship and in all forms one of the geared surfaces may be made of a suitable noise deadening material if desired.

In accordance with the provisions of the patent statutes I have described the principle of operation of my invention, together with the apparatus which I now consider to represent the best embodiments thereof but I desire to have it understood that the apparatus shown and described is only illustrative and that the invention may be carried out by other means.

What I claim as new and desire to secure by Letters Patent of the United States, is:

1. An electric motor comprising a field member having an air gap and means for producing a rotating magnetic field in said air gap, a polarized armature member in said air gap so mounted and of such dimensions that it is permitted to gyrate in said air gap with said rotating magnetic field, a terminal shaft for said motor, and means for causing the gyrating motion of said armature to rotate said shaft at a slower speed than the speed of the rotating magnetic field.

2. An electric motor comprising a field member having an air gap, and means for producing a rotating magnetic field therein, an armature member in said air gap having such dimensions and so supported as to permit limited free bodily movement in the plane of the rotating magnetic field, said armature member being polarized whereby the rotating magnetic field causes a gyrating movement of the armature in synchronism with such field, a terminal shaft for the motor, and means responsive to the gyrating movement of said armature for driving said shaft.

3. An electric motor comprising a field structure having an air gap, and means for producing a rotating magnetic field in said air gap, a polarized armature member in said air gap so mounted and of such dimensions that it is permitted to gyrate in said air gap with the rotating magnetic field, a retaining member upon which said armature rolls as it gyrates, the contacting surfaces of the armature and retaining member having different peripheral lengths and the armature and retaining members being relatively rotatable whereby gyration of said armature member with the rotating magnetic field causes a slower relative rotation between said members.

4. An electric motor comprising a field member having an air gap, and means for producing a rotating magnetic field in said air gap, a magnetic armature member in said air gap, means for producing a unidirectional magnetic field in said air gap in a direction to polarize the magnetic armature at a given magnetic polarity, the armature member being so mounted and of such dimensions to permit it to move bodily in the plane of the rotating magnetic field, means for limiting such bodily movement within a circle concentric with the rotating magnetic field but of greater dimensions than the armature, whereby said armature is gyrated in synchonism with said rotating magnetic field.

5. A self-starting synchronous motor comprising a bipolar, shaded pole field member having a winding adapted to be energized by single phase alternating current to produce a rotating magnetic field means for producing a unidirectional field at right angles to said rotating magnetic field, and a magnetic armature member influenced by both of said fields so as to have a gyratory movement in synchronism with the rotating magnetic field.

6. An electric motor provided with a field member having an air gap, and means for producing a rotating magnetic field in said air gap, a magnetically polarized armature in said air gap so mounted and of such dimensions as to permit it to gyrate in said air gap in synchronism with the rotating magnetic field, a relatively rotatable retaining member for said armature to limit the orbit of gyration, said armature and retaining member having circular contacting surfaces of different diameters in telescoping relation, said surfaces being of such character as to resist tangential slipping.

7. An electric motor having a field structure provided with an air gap, and means for producing a rotating magnetic field in said air gap, a magnetically polarized armature in said air gap so mounted and of such dimensions as to permit it to gyrate in synchronism with the rotating magnetic field, a relatively rotatable retaining member for said armature to limit its orbit of gyration, said armature and retaining member having circular contacting surfaces of different diameters in telescoping relation and cooperating gear teeth on said contacting surfaces, the number of teeth in the surfaces being different whereby gyration of said armature member about said retaining member causes relative rotation of said members.

8. An electric motor having a field structure provided with an air gap, and means for producing a bi-polar rotating magnetic field in said air gap, a magnetically polarized armature member in said air gap so mounted and of such dimensions as to permit it to gyrate in synchronism with the rotating magnetic field, a retaining member for said armature to limit its orbit of gyration, said armature and retaining members having circular contacting surfaces of different diameters in telescoping relation, the surfaces being of such character as to resist slipping in a tangential direction, one of said members being held from rotation and the other being rotatable, and a terminal shaft for the motor driven by the rotatable member.

9. An electric motor having a field structure provided with an air gap, and means for producing a bi-polar rotating magnetic field in said gap, a magnetically polarized armature member mounted to gyrate and to rotate about the axis of rotation of the rotating magnetic field, a stationary retaining member for limiting the orbit of gyration of the armature member, said members having circular contacting surfaces of slightly different diameters in telescoping relation, the character of said contacting surfaces being such as to resist slipping in a tangential direction.

10. An electric motor having a field structure provided with an air gap, and means for producing a rotating magnetic field in said air gap, a magnetically polarized armature member mounted to gyrate and to rotate about the axis of rotation of the rotating magnetic field, a stationary retaining member for limiting the orbit of gyration of the armature member, said members having circular contacting surfaces of slightly different diameters in telescoping relation, gear teeth on such contacting surfaces, the surface of larger diameter having the greater number of teeth, at least one of said geared surfaces being of a noise deadening character.

11. An electric motor having a field structure provided with an air gap, and means for producing a rotating magnetic field in said gap, a magnetically polarized armature member mounted so as to gyrate and to rotate about the axis of rotation of the rotating magnetic field, a stationary retaining member to limit the orbit of gyration of said armature member, said armature and retaining members having circular contacting surfaces of different diameters in telescoping relation, the contacting surfaces being of such character as to resist tangential slipping, whereby the gyration of the polarized armature in synchronism with the rotating magnetic field causes it to rotate, a terminal shaft for said motor, and means for transferring the rotational movement of the armature member to said terminal shaft.

12. In an alternating current motor of the type in which a synchronous relation is maintained between a bi-polar rotating magnetic field and a movable field and a movable magnetic armature on which the field operates, the method of reducing the synchronous speed of rotation which consists in magnetizing the armature element so as to produce therein only one pole of constant magnetic polarity, permitting said armature member to gyrate in synchronism with the rotating magnetic field and converting such gyrating movement into a sub-synchronous rotary movement.

13. An electric motor comprising a field structure having an air gap, and means for producing a bi-polar rotating magnetic field in said air gap, a U-shaped permanent magnet having its poles on opposite sides of said air gap so as to produce a unidirectional magnetic field at approximately right angles to the plane of rotation of the rotating magnetic field, a magnetic armature member in said air gap polarized at a given polarity by the unidirectional field, said armature member being dimensioned and supported so as to gyrate in synchronism with the rotating magnetic field, a terminal shaft for said motor rotatably supported by one of the pole pieces of the permanent magnet, and means for transforming the gyrating movement of said armature into a component of rotary motion for driving said shaft at a fraction of the speed of gyration.

14. An electric motor comprising a field structure having a circular air gap, and means for producing a bi-polar rotating magnetic field in said air gap, a polarized armature member in said air gap, a retaining member for said armature member, said retaining and armature members having smooth, circular contacting surfaces of different diameters in telescoping relation, at least one of said surfaces being a frictional surface, one of said members being rotatable and a terminal shaft in driving relation with the rotatable member.

15. An electric motor comprising a field structure having a circular air gap, and means for producing a bi-polar rotating magnetic field in said air gap, a polarized armature member in said air gap held against rotation but mounted so as to permit it to gyrate with the rotating magnetic field, a rotatable retaining member for said armature member, said armature and retaining members having circular contacting surfaces of different diameters in telescoping relation, said contacting surfaces being of such character as to prevent slipping in a tangential direction whereby gyration of said armature member causes the retaining member to rotate.

16. A self starting synchronous motor having means for producing a bi-polar rotating magnetic field, and a polarized armature member gyrated in synchronism with said field.

17. A self starting synchronous motor having means for producing a bi-polar rotating magnetic field, a polarized armature gyrated in synchronism with said field and means for transforming the gyrations of said armature into a relatively slow rotary movement.

18. A self starting synchronous motor having means for producing a bi-polar rotating magnetic field, a polarized armature gyrated in synchronism with said field and a terminal gear rotated in response to such gyrations at a relatively slower sub-synchronous speed.

In witness whereof, I have hereunto set my hand this 10th day of July, 1930.

HENRY E. WARREN.

CERTIFICATE OF CORRECTION.

Patent No. 1,862,376.                                June 7, 1932.

HENRY E. WARREN.

It is hereby certified that error appears in the printed specification of the above numbered patent requiring correction as follows: Page 2, line 38, for "C." after "P." read M.; page 6, line 83 claim 12, strike out the words "and a movable field"; and that the said Letters Patent should be read with these corrections therein that the same may conform to the record of the case in the Patent Office.

Signed and sealed this 25th day of October, A. D. 1932.

(Seal)

M. J. Moore,
Acting Commissioner of Patents.